US005664844A

United States Patent [19]

Greene

[11] Patent Number: 5,664,844

[45] Date of Patent: Sep. 9, 1997

[54] HARNESS SAFETY SYSTEM

[75] Inventor: Ginette L. Greene, Virginia Beach, Va.

[73] Assignee: Petite Peche Ltd., Virginia Beach, Va.

[21] Appl. No.: 329,934

[22] Filed: Oct. 27, 1994

[51] Int. Cl.$^6$ .............................. A61H 3/00; B60R 22/00

[52] U.S. Cl. .................... 297/485; 297/484; 297/DIG. 6; 119/770

[58] Field of Search .................................... 297/484, 485, 297/DIG. 6; 119/770, 771, 857, 907; 24/306, 442

[56] References Cited

U.S. PATENT DOCUMENTS

| | | | |
|---|---|---|---|
| 1,288,170 | 12/1918 | Pick | 297/484 |
| 2,212,746 | 8/1940 | Nunn | 119/770 |
| 2,677,488 | 5/1954 | Prusan | 119/770 |
| 4,226,474 | 10/1980 | Rupert et al. | 297/484 |
| 4,273,130 | 6/1981 | Simpson | 24/306 X |
| 5,325,818 | 7/1994 | Leach | 119/770 |
| 5,397,171 | 3/1995 | Leach | 297/484 |

FOREIGN PATENT DOCUMENTS

| | | | |
|---|---|---|---|
| 1056714 | 1/1967 | United Kingdom | 297/484 |
| 1132572 | 11/1968 | United Kingdom | 297/484 |

*Primary Examiner*—Peter R. Brown
*Attorney, Agent, or Firm*—Fish & Richardson P.C.

[57] ABSTRACT

A harness safety system for securing a child or mentally or physically impaired adult to a shopping cart seat or basket, stroller, high chair, child sporting seat, wheelchair, or similar seating devices in order to safely and reliably keep the child or mentally or physically impaired adult in a seated position. The harness of the safety system includes an improved chest strap design, front and rear shoulder straps, sliding yoke assembly, and a pair of attachment rings. The safety system further comprises a pair of side restraining assemblies having means for adjustment and for safely and reliably securing the harness to an element of a shopping cart seat or basket, stroller, high chair, child sporting seat, or similar seating devices.

20 Claims, 6 Drawing Sheets

HARNESS SAFETY SYSTEM

BACKGROUND OF THE INVENTION

The present invention relates to a harness safety system for a child or mentally or physically impaired adult. More specifically, the invention is directed to an improved harness safety system which secures a child or mentally or physically impaired adult to a shopping cart seat or basket, stroller, high chair, child sporting seat, wheelchair, or similar seating device in order to safely and reliably keep a child or mentally or physically impaired adult in a seated position. The improved harness safety system additionally includes a walking tether which operates to safely and reliably to secure a child for guidance by an adult attendant.

It is well known that children have an enormous amount of youthful energy and excitement. In this, it is often very difficult to keep a small child close to an adult attendant or seated in a shopping cart seat or basket, stroller, high chair, child sporting seat, or other similar child seating device. Specifically, the infant or child will often attempt to stand or reach out of the seat area of the seating device which creates a potential hazardous situation. If an adult attendant has turned away or left the room for a even an instant, the result can be tragic. The child may fall out of the seat of the child seating device onto the ground causing serious bodily injury or death. Additionally, the child may become entangled in the existing straps and structure of the seating device causing asphyxiation.

According to the United States Consumer Product Safety Commission there have been over a hundred reported injuries or fatalities since 1992 associated with strollers, high chairs, and shopping carts. For example, on Nov. 9, 1992 a one year old child from Oregon died from asphyxiation in connection with a high chair seating device. The child attempted to remove himself from the high chair while the adult attendant was out of the room and became entangled in the high chair straps. Another child from Colorado died on Nov. 12, 1992 from asphyxiation when his neck became Caught between the tray and seat of a high chair while attempting to remove himself. Another child from Wisconsin died on Oct. 29, 1992 from asphyxiation when their torso became wedged in a stroller A five year old child from Colorado died shortly after Jan. 8, 1993 from sliding down a high chair and catching his head. Other similar asphyxiation deaths caused as a result of a child attempting to remove themselves from the seating device have been reported.

Other reported deaths and injuries have been reported as a result of a child falling out of a stroller, high chair, or shopping cart. For example, on Aug. 15, 1993 a one month old child from California died after falling out of a stroller. On Feb. 16, 1994 a one year old child from Arizona and on Mar. 29, 1994 another one year old child from Arizona were seriously injured in a fall from a high chair. On Jul. 17, 1992, an 18 month old child from Arkansas was injured from a fall from a Shopping cart onto the floor in a store. On Mar. 19, 1993, a 13 month old child from Texas was injured in a fall from a shopping cart. Tragically, on Mar. 24, 1994 a three year old boy died as a result of a fall from a high chair while attempting to see himself on a video monitor. Another three year old child from Arkansas died on Sep. 23, 1992 in a fall from a shopping cart.

It is often very difficult for an adult attendant to keep a child close and to keep a child from wandering off while traveling in busy or crowded areas such as side walks on busy streets, shopping centers, or airports. For example, while walking down a side walk of a busy street, constant attention of the adult attendant is necessary in-order-to prevent the child from unknowingly wandering into the moving traffic. Moreover, the concern for abduction of a child while traveling through busy areas is a grave concern for parents of young children. Obviously, the emotional trauma to a parent attendant by any such tragedies is debilitating.

The dangers associated with child seating devices and has led to a number of proposed solutions. Generally, however, these solutions have failed to provide a safe, reliable, comfortable, diverse, and user friendly way to prevent a child from falling out of a child seating device. First, the safety harnesses of the prior art have proven to be complex harness arrangements which are difficult to place on a child. Second, the harnesses of the prior art have proven to be uncomfortable to a child thereby preventing adult attendants from utilizing the safety harness. Significantly, the harnesses of the prior art are of limited use and are not capable of being used in a variety of safety applications. The harnesses of the prior art have been unable to provide an effective way to operate as a child restraining device while still providing the capabilities for use with a walking tether. The harnesses of the prior art have failed to provide a harness which may be easily sized to comfortably fit a child of any size. Moreover, the harness systems of the prior art have failed to provide a harness which can not be removed by a child once properly fitted by an adult attendant.

The difficulties and limitations suggested in the preceding are not intended to be exhaustive, but rather are among many which demonstrate that although significant attention has been devoted to harness safety systems, such systems appearing in the past will admit to worthwhile improvement.

OBJECTS AND BRIEF SUMMARY OF THE INVENTION

It is therefore a general object of the invention to provide a novel harness safety system which will obviate or minimize difficulties of the type previously described.

It is another general object of the invention to provide a novel harness safety system which provides a safe, reliable, diverse, attractive, comfortable, and user friendly way to prevent a child or mentally or physically impaired adult from falling out of a seating device.

It is a specific object of the invention to provide a harness safety system which may be quickly, easily, and securely placed on a child or mentally or physically impaired adult.

It is another specific object of the invention to provide a harness safety system which is capable of safely and reliably securing a child or mentally or physically impaired adult in a variety of different safety applications, It is yet another specific object of the invention to provide a harness safety system which may be used by business owners in order to provide a safe and reliable way to prevent a patron child from falling out of a child seating device.

It is still another specific object of the invention to provide a harness safety system which is capable of being securely and comfortably fitted to a child or mentally or physically impaired adult of any size.

It is still yet another specific object of the invention to provide a harness safety system which is capable of being secured to a child and which prevents the child from removing the safety harness, It is yet another specific object of the invention to provide a harness safety system which may be used to safely secure a child in a child seating device and also provide the capability of connecting with a walking tether.

It is another specific object of the invention to provide a harness safety system which may be easily adapted by an adult attendant depending on the particular use contemplated, It is still another specific object of the invention to provide a harness safety system having means for safely attaching child care devices such as feed bottles, pacifiers, toys, or teethers.

It is still yet another specific object of the invention to provide a harness safety system which safely and reliably secures a physically handicapped individual in a wheelchair device or the like.

BRIEF SUMMARY OF A PREFERRED EMBODIMENT OF THE INVENTION

A preferred embodiment of the invention which is intended to accomplish the foregoing objects comprises a harness safety system for securing a child or mentally or physically impaired adult to a shopping cart seat or basket, stroller, high chair, child sporting seat, wheelchair, or similar seating devices in order to safely and reliably keep the child or mentally or physically impaired adult in a seated position. The harness of the safety system includes an improved chest strap design, front and rear shoulder straps, sliding yoke assembly, and a pair of attachment rings. The safety system further comprises a pair of side restraining assemblies having means for adjustment and for safely and reliably securing the harness to a structural element of a shopping cart seat or basket, stroller, high chair, child sporting seat, wheelchair, or similar seating device.

DRAWINGS

Other objects and advantages of the present invention will become apparent from the following detailed description of a preferred embodiment thereof taken in conjunction with the accompanying drawings, where in:

FIG. **3*a*** is a front view showing the harness safety system of the present invention with the side restraining assemblies secured.

FIG. **3*b*** is a rear view showing the harness safety system of the present invention with the side restraining assemblies secured.

FIG. **4*a*** is a front view showing the harness safety system of the present invention with the side restraining assemblies of an alternative embodiment secured.

FIG. **4*b*** is a rear view showing the harness safety system of the present invention with the side restraining assemblies of an alternative embodiment secured.

FIG. **5*a*** is a side view showing a side restraining assembly or the harness safety system of the present invention.

Figure 6A:
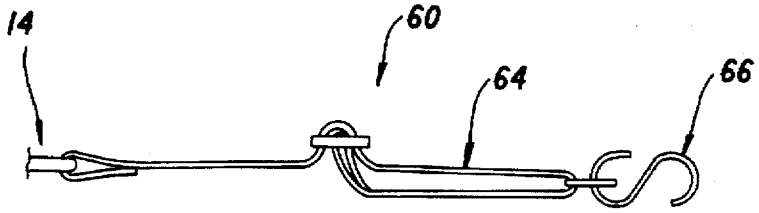

FIG. **5*b* is a side view showing a side restraining assembly of the harness safety system of the present invention which has been wrapped around a structure of a seating device, FIG. 6*a*** is a side view showing a side restraining assembly of an alternative embodiment of the harness safety system of the present invention.

FIG. **6*b*** is a side view showing a side restraining assembly of an alternative embodiment of the harness safety system of the present invention.

Figure 7:
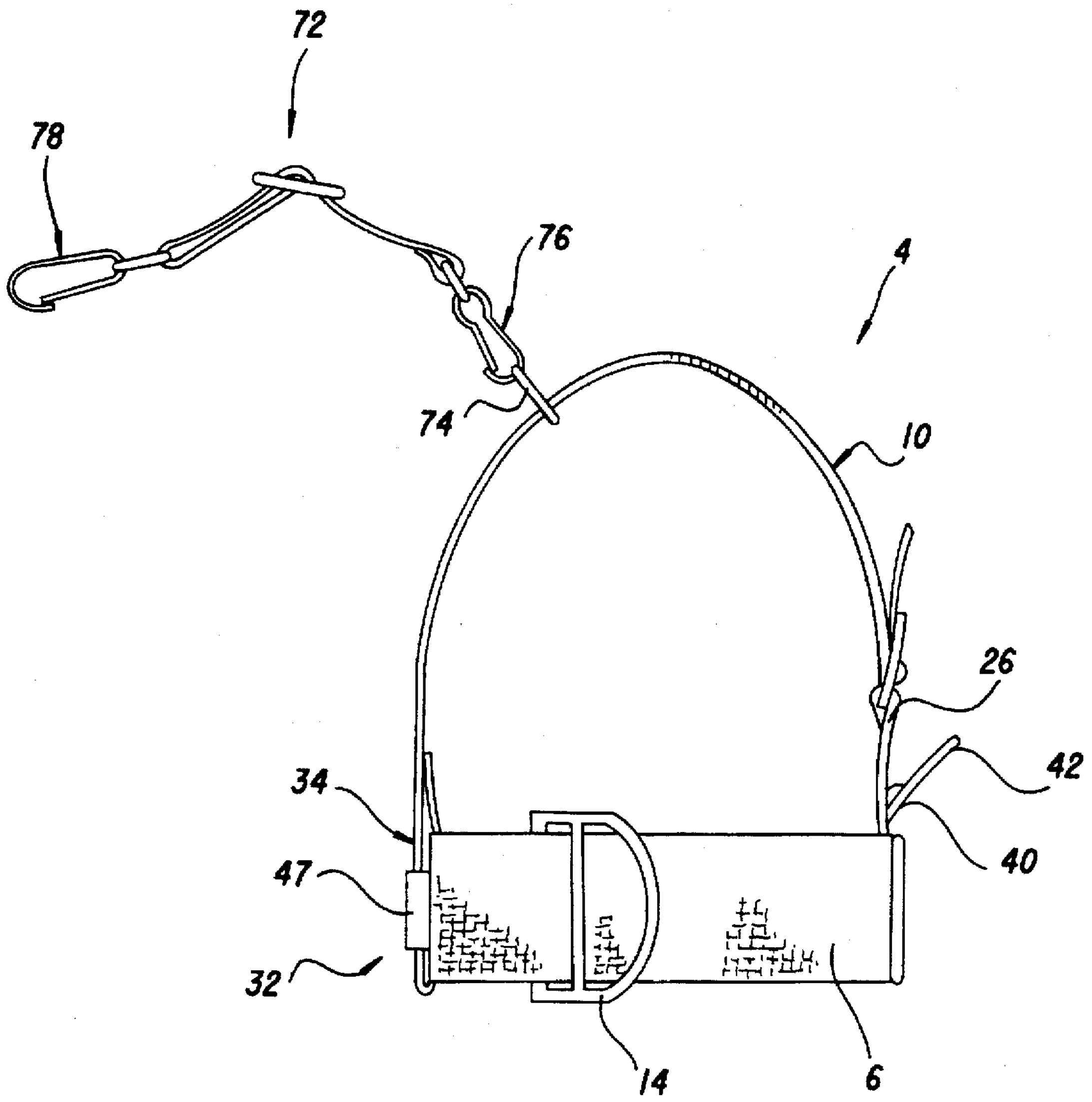

FIG. 7 is a side view showing the harness of the harness safety system with an attached accessory strap of the present invention.

Figure 8:
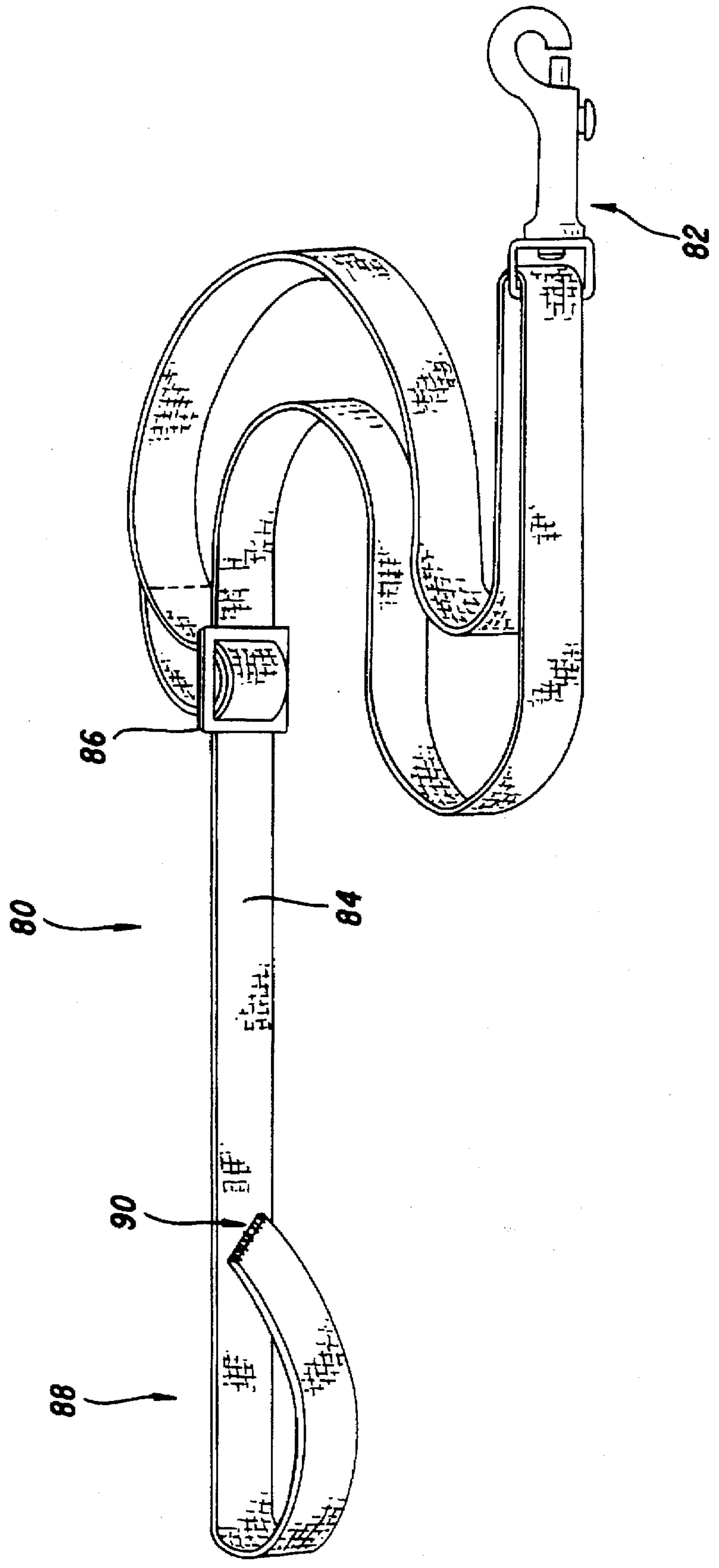

FIG. 8 is an isometric view showing the walking tether of the present invention which is secured to the rear of the harness of the harness safety system of the present invention.

DETAILED DESCRIPTION

Figure 1:
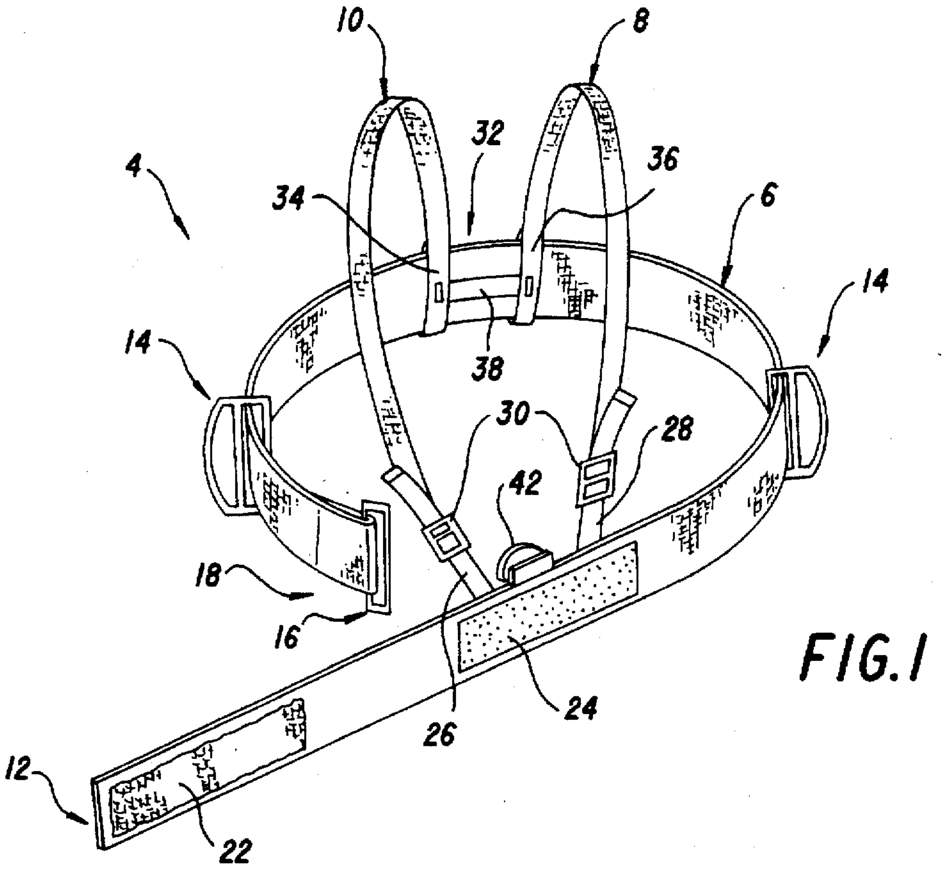
FIG. 1 is an isometric view showing the harness of the harness safety system of the invention in an open position prior to placement on a child or mentally or physically impaired adult.
Figure 2:
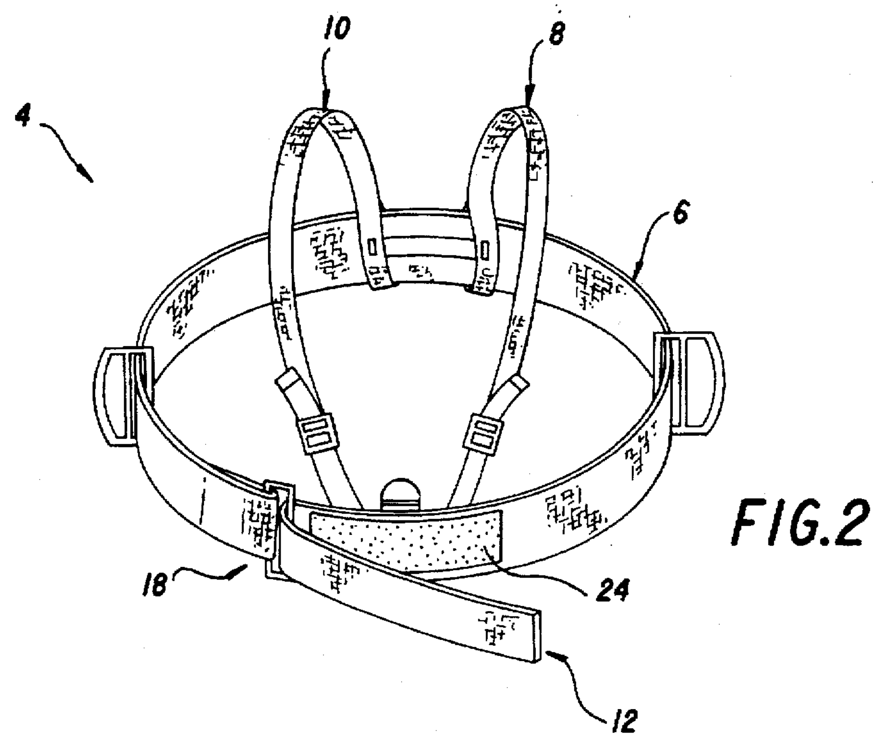
FIG. 2 is an isometric view showing the harness of the harness safety system of the invention as it would appear just prior to completely fastening the chest strap on a child or mentally or physically impaired adult.

Referring now to the drawings and particularly to FIGS. 1 and 2, there is shown a harness 4 of the harness safety system 2 of the present invention. The harness as shown in FIG. 1 is in an open position prior to securing on a child or mentally or physically impaired adult. The harness as shown in FIG. 2 is depicted just prior to a closed position as secured on a child or mentally or physically impaired adult. The harness 4 includes a chest strap 6 and a pair of front shoulder straps 8 and 10. A distal end 12 of the chest strap 6 is inserted though at least one, but preferably two, D-shaped rings 14. The D-shaped rings are a point of attachment for side restraining assemblies 46, 48 and 60, 62 as more completely described below. Preferably the D-shaped rings 14 are of the double bar type so as to maintain the chest strap 6 in a fully extended widthwise position. This assures that the chest strap 6 does not twist or bow when it is worn by a child or the like or when the harness 4 is stored after removal. Other types of looping rings are considered to be within the scope of the invention. A looping ring 16 is secured at a first end of the chest strap 6. Preferably, the looping ring 16 is secured by looping the most distal end of a first end 18 of the chest strap 6 through the ring 16 and stitching the end to an adjacent portion of the chest strap 6. Other attachment means are considered to be within the scope of the invention. In a preferred embodiment, the chest strap is approximately two inches in width. In a preferred embodiment, chest strap 6 is manufactured from a strong and durable nylon webbing. Other similarly strong and durable materials of construction are considered to be within the scope of the invention.

Chest strap 6 has at its distal end a fastening means for fastening adjacent end portions of the strap together. Preferably, the fastening means comprises adjacent portions of contact material. The most preferable type of contact material is the VELCRO brand hook and loop type fastener. The fastener of the present invention is preferably a fold over VELCRO system consisting of a hook portion 22 and a loop portion 24. In use, the chest strap 6 is wrapped around the chest of a child or mentally or physically impaired adult and the end 12 of the chest strap 6 is looped through ring 16 and folded back upon itself such that the hook portion 22 is mated with the loop portion 24 of the VELCRO fastening system. In a preferred design, the hook portion is approximately four inches in length and approximately two inches-in width and the loop portion is approximately seven inches in length and approximately two inches in width.

A pair of rear shoulder straps 26 and 28 are secured, preferably stitched, to the chest strap 6. The rear shoulder straps 26 and 28 are preferably secured at an angle of approximately 30 degrees off the vertical axis in order to optimize the surface area of contact with a child's back. As shown, the rear shoulder straps 26 and 28 are preferably shorter in length than the front shoulder straps 8 and 10. The rear shoulder straps have secured thereon respective ladder locks 30 or the like. Preferably, the ladder locks 30 are secured to the rear shoulder straps by looping a distal end of the rear shoulder straps and folding the strap back onto itself for stitching.

The front shoulder strap assembly consist of front shoulder straps 8 and 10 and yoke assembly 32. One end of the shoulder straps 8 and 10 is looped through a respective ladder lock 30 secured to a respective rear shoulder strap 26, 28 thereby forming an adjustable connection between the front and rear shoulder straps. This design is preferable because a single safety harness of the present invention can be easily adjusted to fit a wide range of children or mentally or physically impaired adult. The other end of the front shoulder straps 8 and 10 is looped around the chest strap and preferably stitched to another portion of the strap as shown in FIGS. 1, 2 and 7 thereby forming respective front shoulder strap loop portions 34 and 36. An inner connecting element 38 is secured, preferably stitched, at one end to inner section of loop portion 34 and at another end to the inner section of loop portion 36 as shown in FIGS. 1 and 2.

The harness 4 further comprises a tether retaining ring 42 for connection with a tether 80 as more completely described with reference to FIG. 8. The ring 42 is preferably constructed from a commercial metal such as a steel alloy in order to provide a secure point of attachment for the tether 80. The ring 42 is preferably D-shaped and is secured to the chest band between the rear shoulder straps 26 and 28 as shown. The ring 42 is secured by a fabric loop 40 which encloses the ring 42 and is stitched at both its ends to the chest band 6. Preferably a reinforcing strip 44 of material is attached to fabric loop 40 in order to provide extra reinforcement. The reinforcing strip 44 is preferably manufactured from a strong and heavy material such as nylon webbing with a glass bead reflective strip.

Figure 3A:
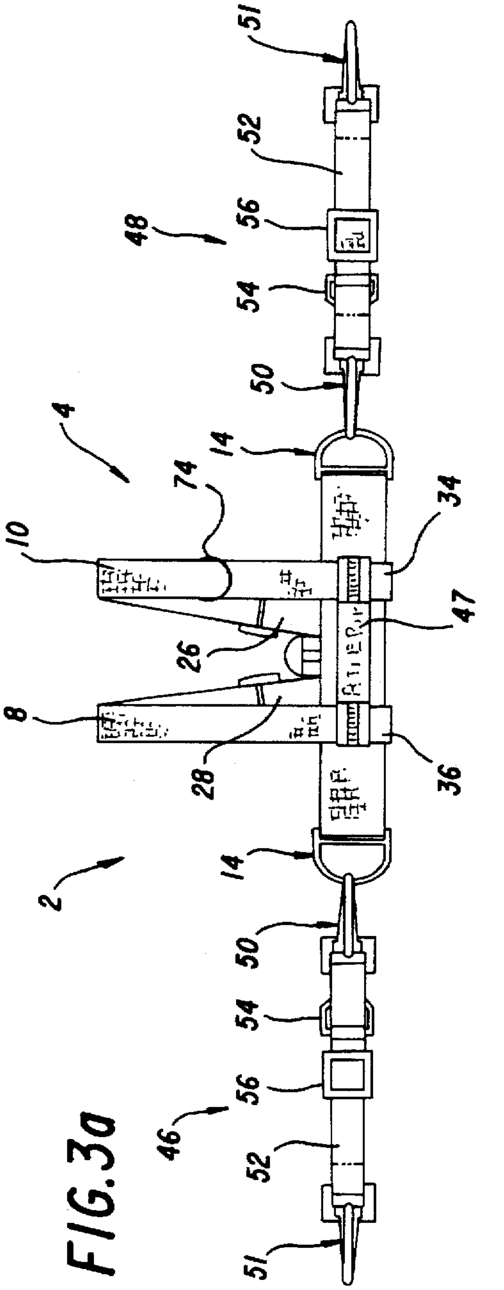
Figure 3B:
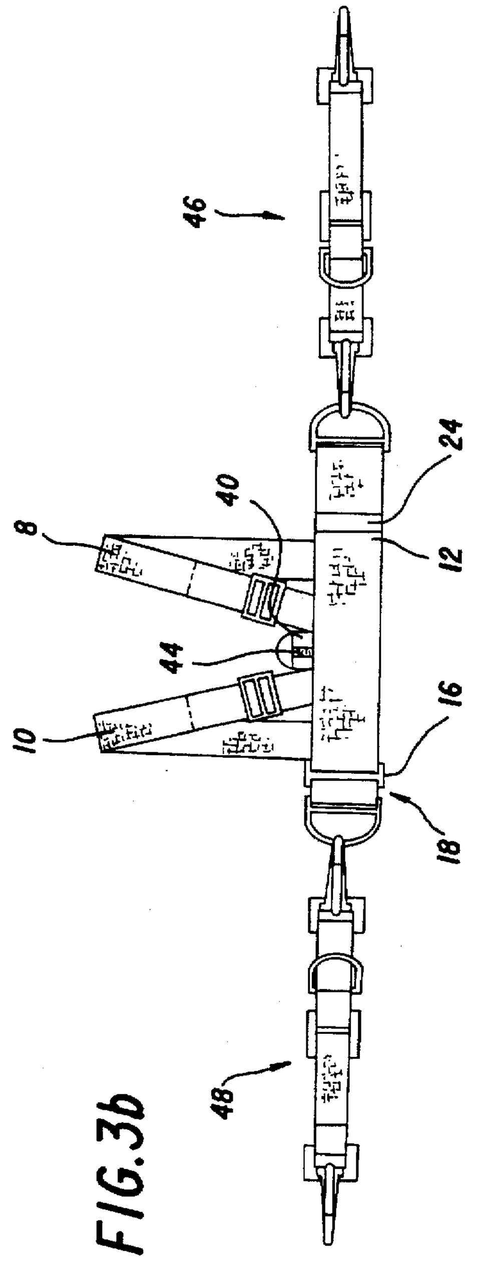
Figure 4A:
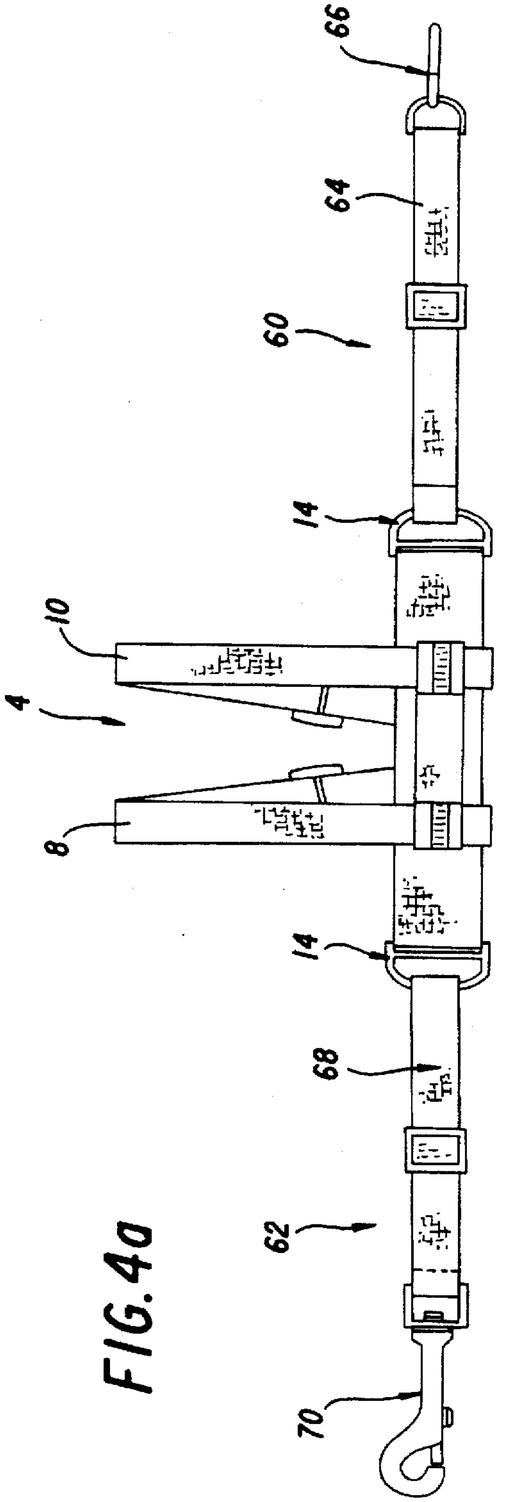
Figure 4B:
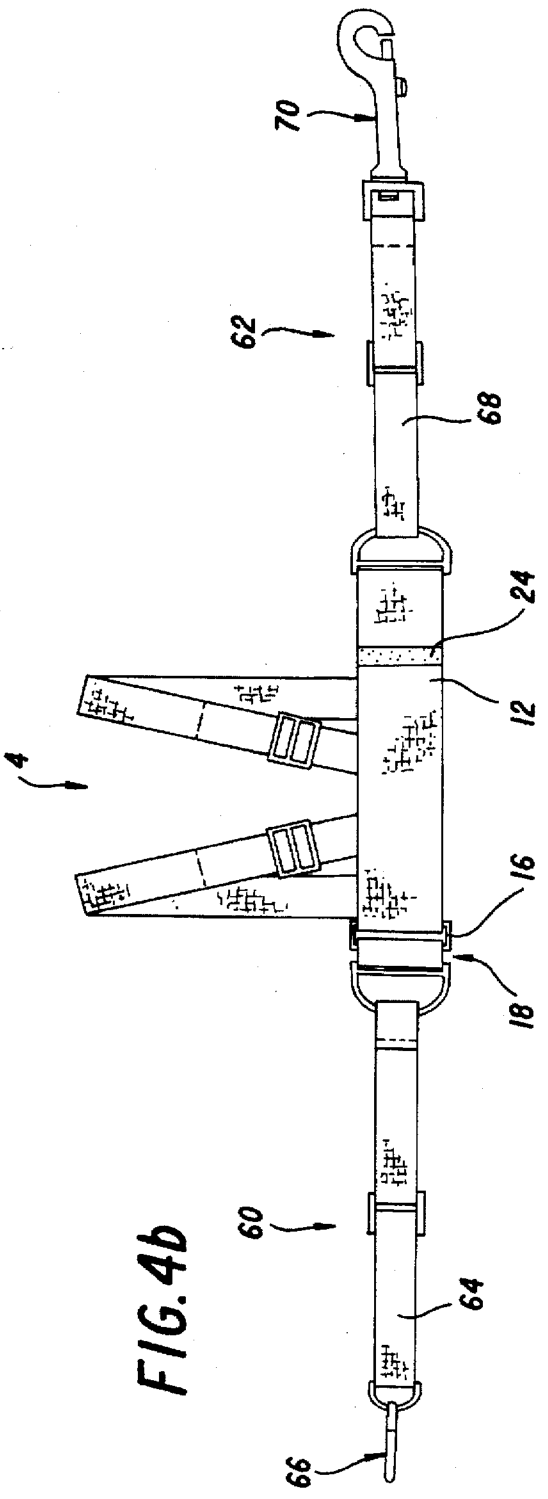
Figure 5A:
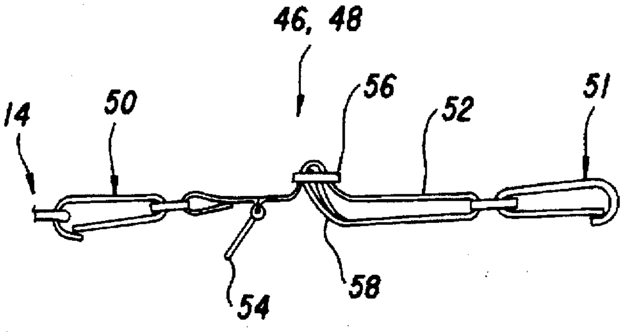
Figure 5B:
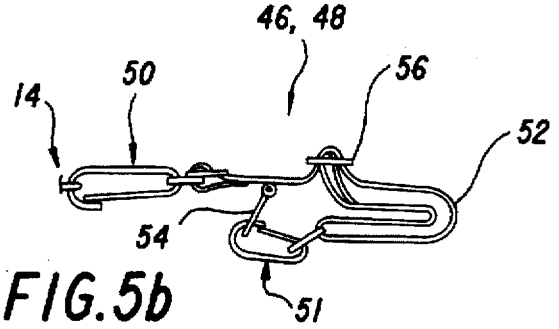
Figure 6B:
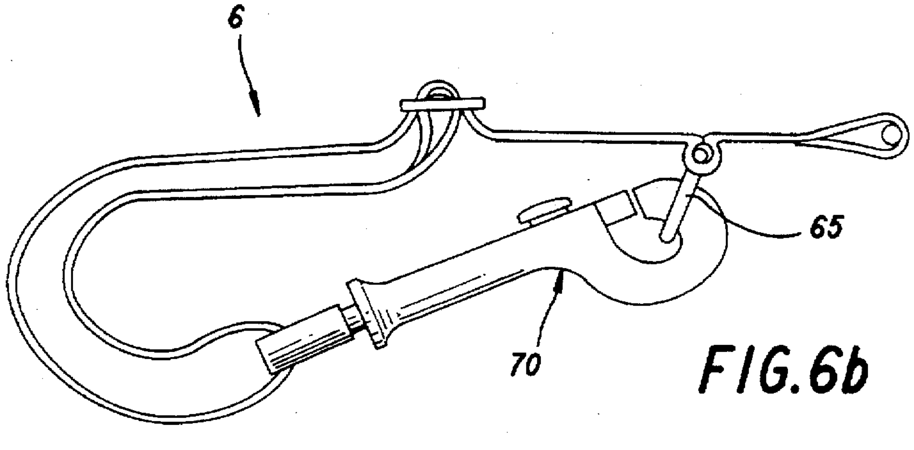

FIGS. 3*a* and 3*b* show a frontal and rear view respectively of a first embodiment of the harness safety system 2 of the present invention. The harness 4 of the harness safety system 2 shown in FIGS. 3*a* and 3*b* is identical to the harness described above with reference to FIGS. 1 and 2. The front side of the yoke assembly 32 is shown in FIG. 3*a*. Specifically, an outer connecting element 47 is secured at one of its ends to loop portion 36 of front shoulder strap 8 and at its other end to loop portion 34 of front shoulder strap 10. Preferably, the outer connecting element 46 is secured at its ends by wrapping the ends around the loop portions 34 and 36 and stitching the end to another portion of the connecting element 47 thereby forming a looped connection with the loop portions 34 and 36. Preferably, the outer connecting element 47 is reinforced with a reinforcing strip in a similar manner as described with respect to fabric loop 40. The yoke assembly consists of loop portions 34 and 36 of shoulder straps 10 and 8 respectively, outer connecting element 47, and inner connecting element 38. The yoke assembly is a preferable connection between the front shoulder straps 8 and 10 and the chest strap 6 because it allows the yoke assembly to slide along the chest band for optimal adjustment and safety. The shoulder straps can easily be maneuvered along the chest strap while maintaining a planar relationship with the chest of the child or mentally or physically impaired adult to obtain maximum area of planar contact which increases safety and comfort. In fact, when the shoulder straps 8, 10 have been properly adjusted, the yoke assembly design provides for self adjustment. The harness safety system of the present invention further comprises two side restraining assemblies 46 and 48 as shown in FIGS. 3*a*, 3*b* and 5*a*. In the first embodiment shown, a first end of the side restraining assembly 46, 48 is secured to the D-shaped ring of chest strap 6 with a snap-hook 50. The snap-hook 50 consist of a hook portion and a base portion. A first end of the strap 52 of the side restraining assembly is looped through the base portion of snap-hook 50 and stitched to another portion of the strap 52 in order to from a permanent connection. A D-shaped ring 54 is stitched to the strap 52 as shown in order to receive snap-hook 51 as described below with reference to FIGS. 5*b* and 6*b*. A tri-glide loop 56 is secured to the strap 52 as shown in order to provide for an adjustable side restraining assembly 46, 48. Specifically, with reference to FIG. 5*a*, a distal end 58 of strap 52 passes looped through the base portion of snap-hook 51 and is stitched to the tri-glide as shown forming a sliding adjustable loop assembly. The side restraining assemblies are identical in formation and operate in the same manner.

The harness safety system of the present invention provides a novel way for restraining a child or mentally or physically impaired adult to a shopping cart seat or basket, stroller, high chair, child sporting seat, wheelchair, or similar seating device in order to safely and reliably keep a child or mentally or physically impaired adult in a seated position. In operation, the harness is first secured on a child or mentally or physically impaired adult by placing the harness over the child's head with the chest strap 6 in an open position as shown in FIG. 1 such that the front shoulder straps 8 and 10 rest on the child's collar bone area and the child's arms protrude through the opening provided by the front shoulder straps 8, 10. The distal end 12 of the chest strap 6 is next inserted through looping ring 16 and the end is folded back such that the hook portion 22 of the VELCRO brand contact material mates with the loop portion 24. The front shoulder straps 8 and 10 are next adjusted with respect to rear shoulder straps 26 and 28 by using loop 30 in order to provide a snug and comfortable fit on the child. The yoke assembly 32 may easily be adjusted along chest strap 6 in order to provide optimum alignment of the shoulder straps 8 and 10 with the particular child. When the harness 4 is properly secured to a child, the chest strap 6 fits just below the child's underarms and is snugly adjusted so that it does not ride up on the child. Securing the chest strap 6 just below the underarms of the child or mentally or physically impaired adult provides a significant advantage over prior art harnesses. First, this design allows for increased comfort of the harness for the child or mentally or physically impaired adult Second, the combination of the rear fold over VELCRO design and the high fitting chest strap assures that the child or mentally or physically impaired adult is incapable of releasing themselves from the harness once it has been properly secured by an adult attendant. Third, should there be an unexpected jerk—for example from the child lunging against the harness while walking or in preventing a fall—the breast level of the child is firmer and stronger and thus injury to the soft tissue organs of the abdomen is avoided. The harness design of the present invention fits on the child in coordination with the child's center of balance, thereby allowing the child to maintain stability while seated in a shopping cart, stroller, high chair or the like or while walking with the tether 80. The novel harness design of the present invention permits the harness to easily be fitted to a particular child with a great range of mobility, comfort, exceptional security, and safety for a child.

After the harness has been properly fitted on a child, the side restraining assemblies 46 and 48 of the harness safety system 2 may now be utilized. First, the snap-hook 50 is clipped onto D-ring 14. The strap 52 is next adjusted by moving the strap through the tri-glide loop as appropriate. The snap-hook 51 is then clipped onto a conducive location on a shopping cart seat or basket, stroller, high chair, child sporting seat, wheelchair, or similar seating device. In some seating devices there are no suitable locations for clipping snap-hook 51 directly. In these situations, strap 52 of the side restraining assembly is wrapped around a side support structure of the seating device and then fastened back onto ring 54 as shown in FIG. *5b*.

Preferably, the side restraining assemblies are secured to the child seating device as low and wide as possible in order to completely restrain the child from leaning forward or extending beyond the limits of the seating device (i.e completely prevent the child from falling out of the child seating device or tipping the device over).

The side restraining assemblies 46 and 48 can be conveniently removed from the D-shaped rings 14 when not in use. That is, when an adult attendant wants to hold a child in their arms or walk the child using the tether 80, snap-hooks 51 are removed, the child is removed from the seating device, and snap-hooks 50 are removed whereby the side retraining assemblies 46, 48 can be conveniently stored away until the child is seated again.

Referring now to FIGS. *4a* and *4b* there is shown an alternative embodiment of the harness safety system of the present invention. The first embodiment described above with reference to FIGS. *3a* and *3b* is designed for every day use by an adult attendant. Specifically, the system described in the first embodiment allowed the adult attendant to remove the side restraining straps when the child was removed from the child seating device. The first embodiment is advantageous for every day use by an adult attendant because it allows for moving the child from one seating device (e.g. stroller) to another (e.g high chair) with easy adjustment of the side restraining straps. The embodiment shown in FIGS. *4a* and *4b* is directed to commercial use by business owners for their patrons. Specifically, the harness safety system of the second embodiment is permanently installed and fastened to a child seating device such as shopping cart seat or basket, stroller, high chair, child sporting seat, or similar articles offered by a business owner for use by its patrons. For example, the harness safety system of the second embodiment is preferably utilized by grocery stores, restaurants, sporting rental companies, or other similar businesses. In this application, it is preferable that the side restraining straps be permanently installed on the seating devices.

The harness 4 depicted in FIGS. *4a* and *4b* identical to that shown and described with reference to FIGS. 1 and 2. The side restraining assemblies 60 and 62 are permanently secured to D-shaped rings 14 as shown. Preferably, a first end of the strap 64 is looped through the ring 14 and stitched on itself. Other securing means are considered to be within the scope of the invention. In the alternative embodiment, side restraining assembly 60 is provided with an S-shaped hook for permanent attachment to a shopping cart seat or basket, stroller, high chair, child sporting seat, wheelchair or similar seating devices. In this, the business owner installs the harness safety system of the alternative embodiment by simply positioning the system on the child seating device and maneuvering side restraining strap 60 such that the S-shaped hook is looped about an appropriate element of the child seating device. The business owner then permanently deforms the S-shaped hook about the element of the child seating device for permanent attachment. When a patron enters the business establishment with a child or the like, the appropriate personnel deliver the child seating device to the patron with the pre-installed harness safety system. The adult attendant then places the child in the child seating device and secures the harness about the child in the identical manner described above. The adult attendant then adjusts the side restraining strap 68 of the alternative embodiment and secures the clasp 70 onto an appropriate location of the child seating device. Preferably, the clasp is a swivel type snaffle clasp having a clasp portion and a base portion. The strap 68 is looped through the base portion of the clasp 70 is stitched to itself as shown in FIGS. *4a*, *4b*, and 6. As indicated, the tether connecting ring 42 is not provided with the harness of the harness safety system of the alternative embodiment. The harness safety system of the alternative embodiment provides a reliable way for businesses to prevent their children patrons from falling out of provided child seating devices.

Referring now to FIG. *6b*, there is shown an alternative design of the second embodiment. Similar to the first embodiment as described with reference to FIG. *5b*, the side restraining assembly 62, as previously described, is preferably equipped with an attachment ring 65 which receives snaffle hook 70. If the child seating device provided by a business owner does not have a conducive structure for securing the snaffle hook 70 directly then the strap 64 of the side restraining assembly is wrapped around a side support structure of the seating device and then fastened back onto ring 65 as shown in FIG. *6b*.

An additional feature of the harness safety system is now discussed with reference to FIG. 7. The harness 4 shown is identical to that shown and described with reference to FIGS. 1 and 2. In the harness 4 shown, a ring 74 is secured to one of the straps 6, 8, 10, 26, and 28 of the harness. Preferably, the ring 74 is secured to one of the front shoulder straps 8 and 10 as shown in the figure. The ring 74 receives a snap-hook 76 of an accessory strap 72. The accessory strap 72 has at its other end an additional snap-hook 78 for attachment to a variety of accessory devices. For example, the accessory strap 72 may secure any child care device such as feed bottle, pacifier, toy, or teether. Moreover, the accessory strap may be conveniently removed a stored away for future use. The accessory strap 72 is generally identical in form to the side restraining straps 46, 48 as previously described with reference to FIGS. *3a* and *3b*.

Referring now to FIG. 8, there is shown a walking tether 80 of the harness safety system of the present invention. A clasp 82 is secured to the walking tether 80 as shown in the figure. Specifically, a first end of the tether strap 84 is looped through a tri-glide ring 86, then through a base of the clasp 82, and back through a the tri-glide and stitched to the strap 84 as indicated. The clasp 82 is preferably a swivel type snaffle clasp as shown in the figure. Alternative types of hook assemblies are considered to be within the scope of the invention. A handle 80 is fabricated at one end of the tether 80. Preferably, the handle 88 is stitched 90 at an angle with respect to the longitudinal axis of the strap 84 in order to provide a handle opening which always remains open to receive the hand of an adult attendant.

In the preferred embodiment, the straps of the disclosed harness safety system are manufactured from a strong and durable nylon webbing. Moreover, the loops and snap-hooks are preferably manufactured from a commercial plastic. A preferable commercial graded plastic is called acetal which is most commonly used in back packs and mountain climbing gear and is extremely strong and durable. The swivel clasps are preferably manufactured from a commercial metal such as nickel plated steel, nickel plated brass, or solid brass which are strong and commonly used for such applications.

SUMMARY OF MAJOR ADVANTAGES OF THE INVENTION

After reading and understanding the foregoing detailed description of an harness safety system in accordance with preferred embodiments of the invention, it will be appreciated that several distinct advantages of the subject harness safety system are obtained.

Without attempting to set forth all of the desirable features of the instant harness safety system, at least some of the major advantages include providing a harness 4 having a chest strap 6 which can be fitted around the chest of a child or mentally or physically impaired adult. The chest is provided with a fastening means, preferably VELCRO brand hook 22 and loop 24 type fastener for removably and snugly securing the chest strap about the chest cavity of a child or mentally or physically impaired adult. A pair of front shoulder straps 8, 10. are adjustably connected with a pair of rear shoulder straps 26, 28 for fitting about the arms and shoulders of a child or mentally or physically impaired adult. A yoke assembly 32 provides for a sliding connection between the chest strap 6 and the front shoulder straps 8 and 10 to enable easy adjustment and optimal fitting on a child or mentally or physically impaired adult. The novel harness design of the present invention insures that a child or mentally or physically impaired adult will be unable to free themselves of the harness once it has been properly fitted by an adult attendant.

The chest strap 6 has secured thereto a pair of rings 14 for attachment to a respective side restraining assembly 46, 48 or 60, 62. In a first embodiment, the side restraining assemblies 46, 48 are removably attached to respective rings 14 to permit an adult attendant to secure the restraining assemblies as necessary and remove the restraining assemblies when not being utilized to secure the child in a child seating device. For example, when an adult attendant desires to walk the child with the walking tether 80, then the side restraining assemblies 46, 48 are removed and the walking tether 80 is secured to tether ring 42. In a second embodiment, the side restraining assemblies 60 and 62 are permanently attached to the rings 14 of the harness 4. Moreover, one of the side restraining straps 60 is permanently secured using S-shaped clasp 66 to a shopping cart seat or basket, stroller, high chair, child sporting seat, wheelchair, or similar seating devices. The second embodiment is advantageous for use by business owners in order to provide a safe and reliable way for securing child or mentally or physically impaired adult patrons to seating devices.

In describing the invention, reference has been made to a preferred embodiment and illustrative advantages of the invention. Those skilled in the art, however, and familiar with the instant-disclosure of the subject invention, may recognize additions, deletions, modifications, substitutions and other changes which fall within the purview of the subject invention.

What is claimed:

1. A harness safety system for safely securing a child or mentally or physically impaired adult comprising:

a chest strap having first and second ends for positioning around the chest of a child or mentally or physically impaired adult;

loop means secured to the first end of said chest strap;

fastening means secured to the second end of said chest strap such that when said chest strap is positioned around the chest of a child or mentally or physically impaired adult, said second end of said chest strap is placed through said loop means and folded back upon itself for securing by said fastening means thereby providing a snug fit of the chest strap about the chest of a child or mentally or physically impaired adult;

at least a pair of attachment rings through which said chest strap extends;

first and second front shoulder straps each having a first and second end whereby the first end of said shoulder straps is looped about said chest strap and stitched to itself thereby forming a looped connection capable of sliding along said chest strap;

a pair of rear shoulder straps secured to said chest strap and having a locking means secured to an end of said pair of rear shoulder straps opposite the end secured to said chest strap such that said second ends of said front shoulder straps loop through respective locking means of said pair of rear shoulder straps so as to form an adjustable shoulder strap assembly;

first and second side restraining assemblies having first and second ends such that a first end of said first side restraining assembly is connected to one of said pair of attachment rings and said first end of said second side restraining assembly is connected to the other of said pair of attachment rings, said second ends of said first and second side restraining assemblies having a securing means secured thereon for connection to a shopping cart, high chair, booster seat, stroller, wheelchair or similar seating device;

a shoulder strap connecting element having first and second ends such that said first end of said connecting element is secured to said looped connection of said first shoulder strap and the second end of said shoulder strap connecting element is secured to said looped connection of said second shoulder strap thereby forming a sliding yoke connection between said shoulder straps and said chest strap, wherein said shoulder strap connecting element is secured such that it can slide along an outer surface of said chest strap; and a further shoulder strap connecting element having first and second ends such that said first end is secured to said first looped connection of said first shoulder strap and the second end of said further shoulder strap connecting element is secured to said second looped connection of said second shoulder strap such that said further connecting element can slide along an inner surface of said chest strap.

2. A harness safety system as defined in claim 1 wherein said fastening means comprises a contact type fastening material such that a first portion of the contact material runs a length and is secured to a surface of the second end of said chest strap and a second portion of the contact material runs a length and is secured to another surface of said chest strap such that when said second end of said chest strap is placed through said loop means and is folded back upon itself, the first and second portions of said contact material mate with each other thereby forming a secure and firm connection between the portions of the chest strap.

3. A harness safety system as defined in claim 2 wherein said contact material is a hook and loop fastening means.

4. A harness safety system as defined in claim 3 wherein said first portion of said contact material is the hook material of the hook and loop fastening means and runs a length of approximately 4 inches and said second portion of said contact material is a loop material of the hook and loop fastening means and runs a length of approximately 7 inches.

5. A harness safety system as defined in claim 4 wherein said chest strap is two inches in width and said first and second portions of said contact material are two inches in width.

6. A harness safety system as defined in claim 1 wherein said chest strap is two inches in width.

7. A harness safety system as defined in claim 1 further comprising a tether restraining ring secured on said chest strap at a location between said pair of rear shoulder straps.

8. A harness safety system as defined in claim 7 wherein said tether restraining ring is secured to said chest strap by a fabric loop secured to said chest strap whereby said tether ring extends through the loop formed by said fabric.

9. A harness safety system as defined in claim 7 wherein a walking tether having a first and second end is secured to said tether restraining ring.

10. A harness safety system as defined in claim 9 wherein the second end of said tether is looped around and secured to another portion of said tether at an angle such that the loop portion always remains open for grasping by an adult attendant.

11. A harness safety system as defined in claim 9 wherein the first end of said tether is looped through a swivel hook assembly and then through a glide ring and secured to another portion of the tether in order to form a continuous loop for adjustment of the length of the tether.

12. A harness safety system as defined in claim 1 wherein said shoulder strap connecting element is secured to said looped connection of said first and second shoulder strap at its respective first and second ends by wrapping said first and second ends about the looped portion and sewing the second end of the connecting element to itself.

13. A harness safety system as defined in claim 1 wherein said pair of attachment rings are double bar D-rings.

14. A harness safety system as defined in claim 1 wherein each of said first ends of the first and second side restraining assemblies is provided with a first snap hook secured thereon wherein said snap hook comprises a loop having a movable portion.

15. A harness safety system as defined in claim 14 wherein a loop ring is secured to said first and second side restraining assemblies at a location adjacent to the respective first ends of said first and second side restraining assemblies, such that said snap hook can be operably connected to said loop ring.

16. A harness safety system as defined in claim 14 wherein said second end of said first and second side restraining assemblies is looped through a tri-glide comprising a loop having a single center bar or the like and then through a second snap hook and back through said center bar of the tri-glide and secured to the strap to form a continuous loop allowing for adjustment of the length of the strap of the side restraining assembly.

17. A harness safety system as defined in claim 1 wherein said second end of said first and second side restraining assemblies is looped through a tri-glide comprising a loop having a single center bar or the like and then through a base ring and back through the center bar of the tri-glide and is stitched to another portion of the strap.

18. A harness safety system as defined in claim 1 wherein a ring or the like is secured on at least one of said first and second shoulder straps for receiving an accessory strap assembly.

19. A harness safety system as defined in claim 1 wherein said loop means and said locking means is manufactured from acetal.

20. A harness safety system as defined in claim 1 wherein said locking means means is a ladder lock.

* * * * *